US012617485B2

(12) United States Patent
Inoue et al.

(10) Patent No.: US 12,617,485 B2
(45) Date of Patent: May 5, 2026

(54) HUB ASSEMBLY FOR HUMAN-POWERED VEHICLE

(71) Applicant: Shimano Inc., Osaka (JP)

(72) Inventors: Kenkichi Inoue, Osaka (JP); Yuuya Yoneda, Osaka (JP); Azusa Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 1135 days.

(21) Appl. No.: 17/336,774

(22) Filed: Jun. 2, 2021

(65) Prior Publication Data

US 2022/0388333 A1     Dec. 8, 2022

(51) Int. Cl.
| | |
|---|---|
| *B62J 6/12* | (2006.01) |
| *B60B 27/00* | (2006.01) |
| *B60B 27/02* | (2006.01) |
| *B60B 27/04* | (2006.01) |
| *B62J 45/00* | (2020.01) |
| *B62J 45/413* | (2020.01) |

(52) U.S. Cl.
CPC ............. B62J 6/12 (2013.01); B60B 27/0068 (2013.01); B60B 27/04 (2013.01); B62J 45/413 (2020.02); *B60B 27/023* (2013.01); *B62J 45/00* (2020.02)

(58) Field of Classification Search
CPC ... B62J 6/12; B62J 45/413; B62J 45/00; B62J 45/423; B60B 27/0068; B60B 27/04; B60B 27/023; B60B 27/0047; B60B 27/0073; B60Y 2200/13; B62M 9/10
See application file for complete search history.

(56) References Cited

U.S. PATENT DOCUMENTS

| | | | |
|---|---|---|---|
| 6,418,797 | B1 | 7/2002 | Ambrosina et al. |
| 6,992,413 | B2 | 1/2006 | Endo et al. |
| 8,657,047 | B2 | 2/2014 | Urabe et al. |
| 9,428,246 | B2 | 8/2016 | Kitamura et al. |
| 10,787,032 | B2 | 9/2020 | Yamazaki |
| 2011/0303471 | A1* | 12/2011 | Urabe ..................... B60L 50/20 |
| | | | 180/65.51 |
| 2013/0049448 | A1* | 2/2013 | Kitamura ............ B60B 27/0068 |
| | | | 301/110.5 |

(Continued)

FOREIGN PATENT DOCUMENTS

| | | |
|---|---|---|
| CN | 107453541 A | 12/2017 |
| CN | 107757251 A | 3/2018 |

(Continued)

OTHER PUBLICATIONS

English translation of JP-2018095215-A (Year: 2018).*
English translation of EP-2348618-A2 (Year: 2011).*

*Primary Examiner* — Tulsidas C Patel
*Assistant Examiner* — Joshua Kiel M Rodriguez
(74) *Attorney, Agent, or Firm* — Spencer Fane, LLP

(57)     ABSTRACT

A hub assembly is provided for a human-powered vehicle. The hub assembly includes a hub axle, a hub body, a bearing spacer and a first hub body bearing. The hub body is rotatably mounted on the hub axle to rotate around a rotational center axis of the hub assembly. The bearing spacer has an inner peripheral end provided to the hub axle and an outer peripheral end spaced radially outward of the inner peripheral end in a radial direction with respect to the rotational center axis. The first hub body bearing is disposed at the outer peripheral end of the bearing spacer and rotatably supporting the hub body.

26 Claims, 9 Drawing Sheets

(56) References Cited

U.S. PATENT DOCUMENTS

| 2013/0145885 | A1 | * | 6/2013 | Kitamura | ............... | B62M 25/08 |
| | | | | | | 310/67 A |
| 2018/0057107 | A1 | | 3/2018 | Yamamoto | | |
| 2018/0170099 | A1 | | 6/2018 | Yamazaki | | |
| 2018/0362108 | A1 | | 12/2018 | Yamazaki | | |

FOREIGN PATENT DOCUMENTS

| EP | 2348618 | A2 | * | 7/2011 | ........... | H02K 11/215 |
| JP | 2018095215 | A | * | 6/2018 | ........... | B60B 27/023 |
| JP | 6469537 | B2 | * | 2/2019 | | |

* cited by examiner

HUB ASSEMBLY FOR HUMAN-POWERED VEHICLE

BACKGROUND

Technical Field

This disclosure generally relates to a hub assembly for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub body that is coaxially coupled to the hub axle so that the hub body is disposed radially outwardly with respect to the hub axle. The bearings are configured and arranged to support the hub body so that the hub body can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub assembly is provided for a human-powered vehicle. The hub assembly basically comprises a hub axle, a hub body, a bearing spacer and a first hub body bearing. The hub body is rotatably mounted on the hub axle to rotate around a rotational center axis of the hub assembly. The bearing spacer has an inner peripheral end provided to the hub axle and an outer peripheral end spaced radially outward of the inner peripheral end in a radial direction with respect to the rotational center axis. The first hub body bearing is disposed at the outer peripheral end of the bearing spacer and rotatably supporting the hub body.

With the hub assembly according to the first aspect, the hub assembly can be configured to easily accommodate additional components in the hub body.

In accordance with a second aspect of the present disclosure, the hub assembly according to the first aspect is configured so that the bearing spacer includes an axial opening at least partly formed in an angular region defined between a horizontally forward direction and a vertically upward direction that is perpendicular to the horizontally forward direction, in a mounting state where the hub assembly is mounted to the human-powered vehicle. A central angle is defined by the horizontally forward direction and the vertically upward direction is equal to ninety degrees. The horizontally forward direction and the vertically upward direction extend from the rotational center axis.

With the hub assembly according to the second aspect, it is possible to reduce the weight of the hub assembly without compromising the durability of the hub assembly.

In accordance with a third aspect of the present disclosure, the hub assembly according to the first or second aspect further comprises an electric circuit board disposed in the hub body, and a sensor disposed in the hub body. The sensor is electrically connected to the electric circuit board by a first conductor.

With the hub assembly according to the third aspect, it is possible to obtain various information regarding the hub assembly using the electric circuit board and the sensor.

In accordance with a fourth aspect of the present disclosure, the hub assembly according to the third aspect is configured so that the sensor is arranged at a position separated from the electric circuit board in a direction parallel to the rotational center axis.

With the hub assembly according to the fourth aspect, it is possible to place the sensor in the optimal position.

In accordance with a fifth aspect of the present disclosure, the hub assembly according to the fourth aspect is configured so that the electric circuit board is arranged perpendicular to the rotational center axis.

With the hub assembly according to the fifth aspect, it is possible to increase the degree of freedom in arranging parts and facilitate compact arrangement of the electric circuit board.

In accordance with a sixth aspect of the present disclosure, the hub assembly according to any one of the third aspect to the fifth aspect is configured so that the bearing spacer includes an axial opening, and the sensor is disposed at a position that is axially aligned within the axial opening of the bearing spacer.

With the hub assembly according to the sixth aspect, it is possible to increase the detection ability of the sensor.

In accordance with a seventh aspect of the present disclosure, the hub assembly according to any one of the third aspect to the sixth aspect is configured so that the electric circuit board is electrically connected to a capacitor by a second conductor.

With the hub assembly according to the seventh aspect, it is possible to provide power to the electric circuit board while the human-powered vehicle is stopped.

In accordance with an eighth aspect of the present disclosure, the hub assembly according to the seventh aspect is configured so that the electric circuit board has an arc shape, and has a first circumferential end portion, a second circumferential end portion and at least one arc shaped edge extending at least partly from the first circumferential end portion to the second circumferential end portion, and the second conductor extends from one of the first circumferential end portion and the second circumferential end portion.

With the hub assembly according to the eighth aspect, it is possible to provide a compact arrangement of the parts in the hub body.

In accordance with a ninth aspect of the present disclosure, the hub assembly according to the eighth aspect is configured so that the at least one arc shaped edge includes at least one of an inner arc shaped edge and an outer arc shaped edge with respect to the rotational center axis.

With the hub assembly according to the ninth aspect, it is further possible to provide a compact arrangement of the parts in the hub body.

In accordance with a tenth aspect of the present disclosure, the hub assembly according to the eighth or ninth aspect further comprises a housing disposed in the hub body, and has an outer peripheral surface defining an internal space in which the electric circuit board is disposed.

With the hub assembly according to the tenth aspect, it is possible to protect the electric circuit board more reliably.

In accordance with an eleventh aspect of the present disclosure, the hub assembly according to the tenth aspect is configured so that the housing is non-rotatable with respect to the hub axle.

With the hub assembly according to the eleventh aspect, it is possible to more reliably protect the parts in the housing.

In accordance with a twelfth aspect of the present disclosure, the hub assembly according to any one of the third aspect to the eleventh aspect is configured so that further comprises a second hub body bearing rotatably supporting an end of the hub body, and the first hub body bearing rotatably supports the other end of the hub body with respect to the rotational center axis.

With the hub assembly according to the twelfth aspect, it is possible to reliably support the hub body for rotation on the hub axle.

In accordance with a thirteenth aspect of the present disclosure, the hub assembly according to any one of the sixth aspect to the twelfth aspect further comprises a sprocket support structure rotatably disposed around the rotational center axis to transmit a driving force to the hub body while rotating in a driving rotational direction around the rotational center axis.

With the hub assembly according to the thirteenth aspect, the sprocket support structure functions as freewheel to allow the sprocket support structure to stop rotating during coasting.

In accordance with a fourteenth aspect of the present disclosure, the hub assembly according to the thirteenth aspect further comprises a detected part coupled to the sprocket support structure, and the sensor includes a rotation detection sensor configured to detect the detected part such that rotation of the sprocket support structure around the rotational center axis is detected.

With the hub assembly according to the fourteenth aspect, it is possible to reliable detect rotation of the sprocket support structure.

In accordance with a fifteenth aspect of the present disclosure, the hub assembly according to the thirteenth aspect further comprises a first sprocket support bearing and a second sprocket support bearing. The first sprocket support bearing rotatably supports a first end of the sprocket support structure. The second sprocket support bearing rotatably supports a second end of the sprocket support structure. The first sprocket support bearing and the second sprocket support bearing have outer diameters that are smaller than the outer peripheral end of the bearing spacer.

With the hub assembly according to the fifteenth aspect, it is possible to reliable support the sprocket support structure for rotation while minimizing weight.

In accordance with a sixteenth aspect of the present disclosure, the hub assembly according to any one of the first aspect to the fifteenth aspect further comprises an electric power generator provided to the hub body, and configured to generate electric power by rotation of the hub body.

With the hub assembly according to the sixteenth aspect, it is possible to generate electrical power when the hub body is rotating.

In accordance with a seventeenth aspect of the present disclosure, an electrical component is provided for a human-powered vehicle. The electrical component comprises an electric circuit board, at least one conductor and at least one capacitor. The electric circuit board has an arc shape. The electric circuit board has a first circumferential end portion, a second circumferential end portion and at least one arc shaped edge extending at least partly from the first circumferential end portion to the second circumferential end portion. The at least one conductor is configured to extend from one of the first circumferential end portion and the second circumferential end portion. The at least one capacitor is electrically connected to the at least one conductor.

With the electrical component according to the seventeenth aspect, it is further possible to provide a compact arrangement of the parts in the hub body.

In accordance with an eighteenth aspect of the present disclosure, the electrical component according to the seventeenth aspect further comprises a sensor disposed at a position separated from the electric circuit board, and an additional conductor electrically connecting the sensor and the electric circuit board.

With the electrical component according to the eighteenth aspect, it is possible to detect rotation of the sprocket support structure.

Also, other objects, features, aspects and advantages of the disclosed hub assembly and the disclosed electrical component will become apparent to those skilled in the art from the following detailed description, which, taken in conjunction with the annexed drawings, discloses preferred embodiments of the disclosed hub assembly and the disclosed electrical component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
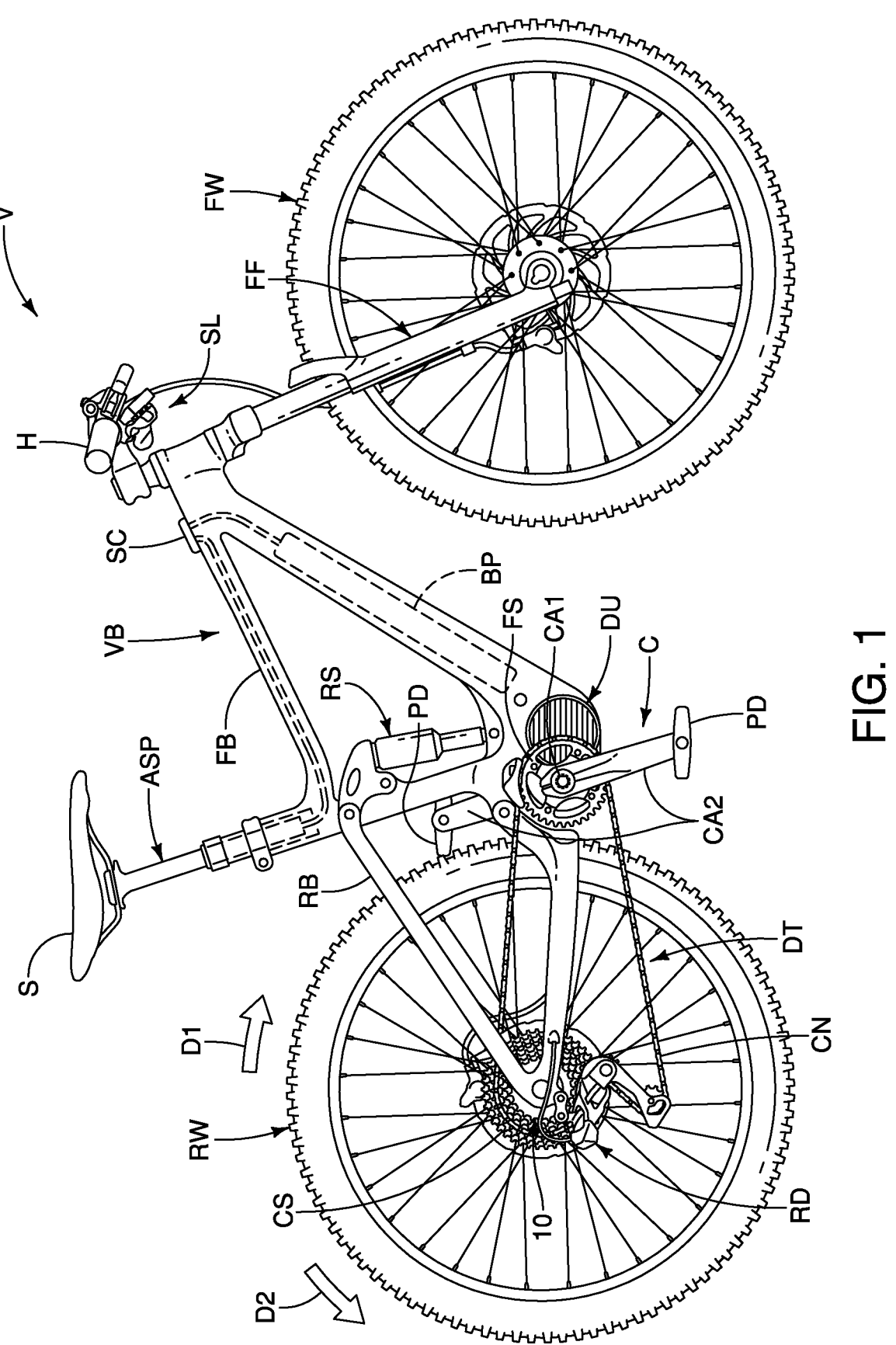
FIG. 1 is a side elevational view of a human-powered vehicle (i.e., bicycle) equipped with a hub assembly (i.e., a bicycle hub assembly) in accordance with a first embodiment.

Referring initially to FIG. 1, a hub assembly 10 is provided to a human-powered vehicle V. In other words, the human-powered vehicle V (i.e., a bicycle) is illustrated that is equipped with the hub assembly 10 in accordance with an illustrated embodiment. Here, in the illustrated embodiment, the hub assembly 10 is a bicycle hub. More specifically, the hub assembly 10 is a bicycle rear hub. Also, here, in the illustrated embodiment, the hub assembly 10 is a hub dynamo for providing electric power to one or more components of the bicycle V. However, the hub assembly 10 is not limited to a hub dynamo. In particular, certain aspects of the hub assembly 10 can be provided that does not generate electric power. Also, while the hub assembly 10 is illustrated as a rear hub, certain aspects of the hub assembly 10 can be provided to a front hub. Thus, the hub assembly 10 is not limited to a rear hub.

Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle. As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The bicycle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. The main battery pack BP can provide electrical power to other vehicle components such as the rear derailleur RD, the height adjustable seatpost ASP, the rear shock absorber RS, the front fork FF and any other vehicle component that uses electrical power.

The bicycle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the bicycle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the bicycle V.

Here, the bicycle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub assembly 10. The rear derailleur RD can be operated when a rider of the bicycle V manually operates a gear shift operating device or shifter SL. The rear derailleur RD can also be automatically operated based on traveling conditions and/or operating conditions of the bicycle V. The bicycle V can further include a plurality of electronic components. Some or all of the electronic components can be supplied with electric power generated by the hub assembly 10 during a power generation state as discussed herein.

The structure of the hub assembly 10 will now be described with particular reference to FIGS. 2 to 6. The hub assembly 10 comprises a hub axle 12 and a hub body 14. The hub axle 12 is configured to be non-rotatably attached to the vehicle body VB. In this embodiment, the hub axle 12 is configured to be non-rotatably attached to the rear frame body RB. The hub body 14 is rotatably mounted on the hub axle 12 to rotate around a rotational center axis A1 of the hub assembly 10. The hub axle 12 has a center axis coaxial with the rotational center axis A1. The hub body 14 is rotatably disposed around the rotational center axis A1. In other words, the hub body 14 is rotatably mounted around the hub axle 12.

Figure 2:
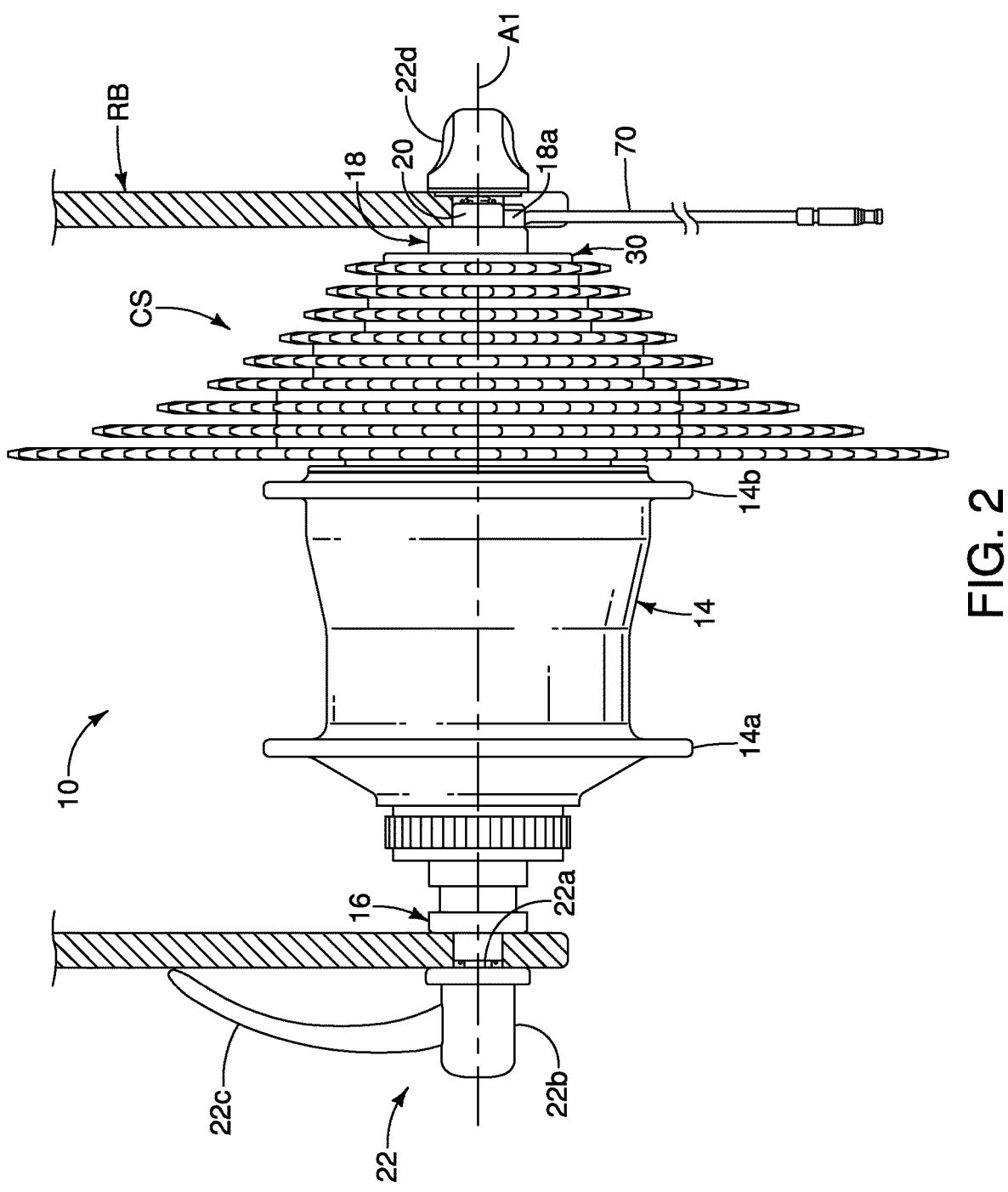
FIG. 2 is a longitudinal elevational view of the hub assembly attached to the vehicle body of the human-powered vehicle illustrated in FIG. 1.
Figures 3, 4:
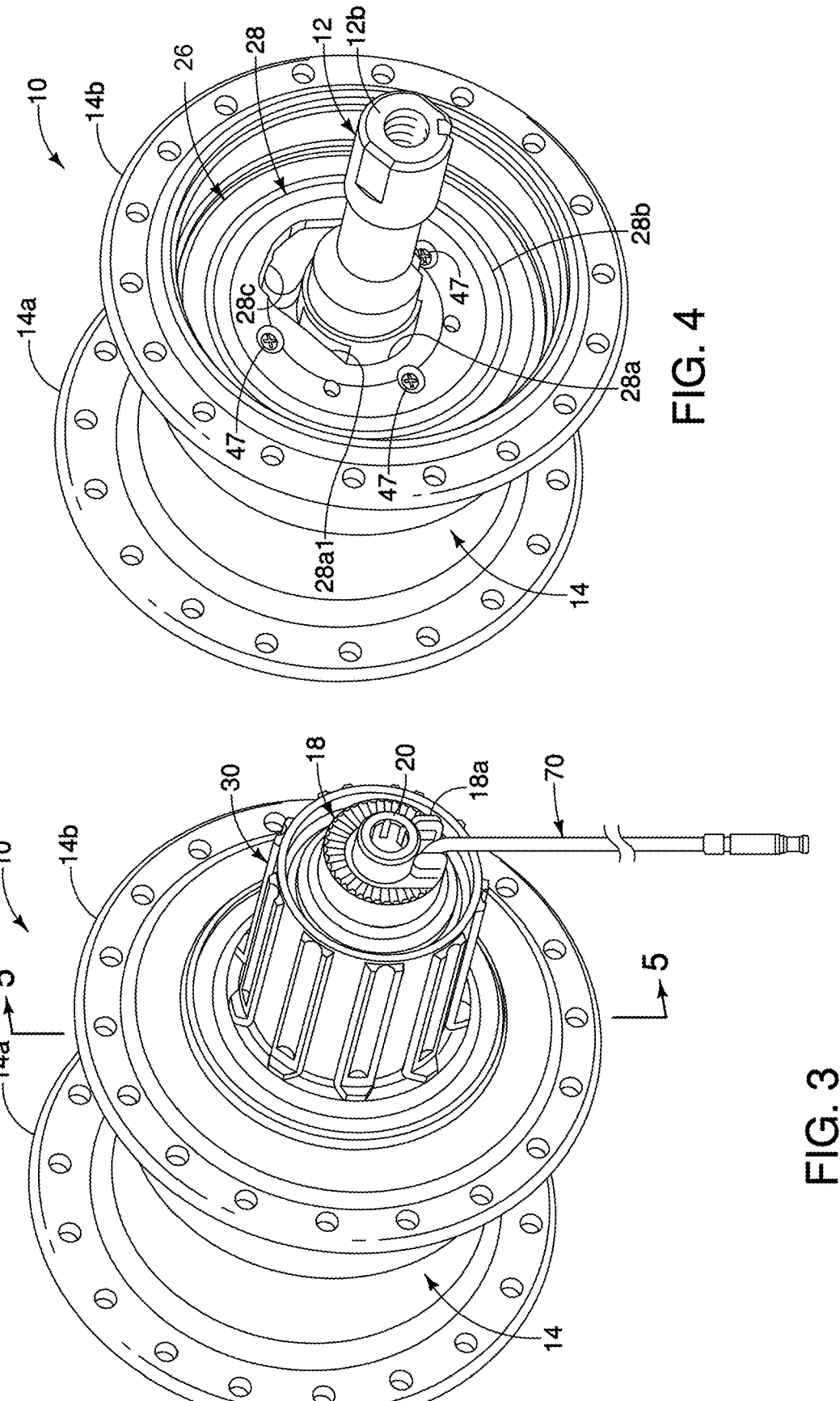
FIG. 3 is a perspective view of the hub assembly illustrated in FIG. 1.
FIG. 4 is a perspective view of the hub assembly illustrated in FIGS. 2 and 3 but in which selective part have been removed to show the bearing spacer.
Figure 5:
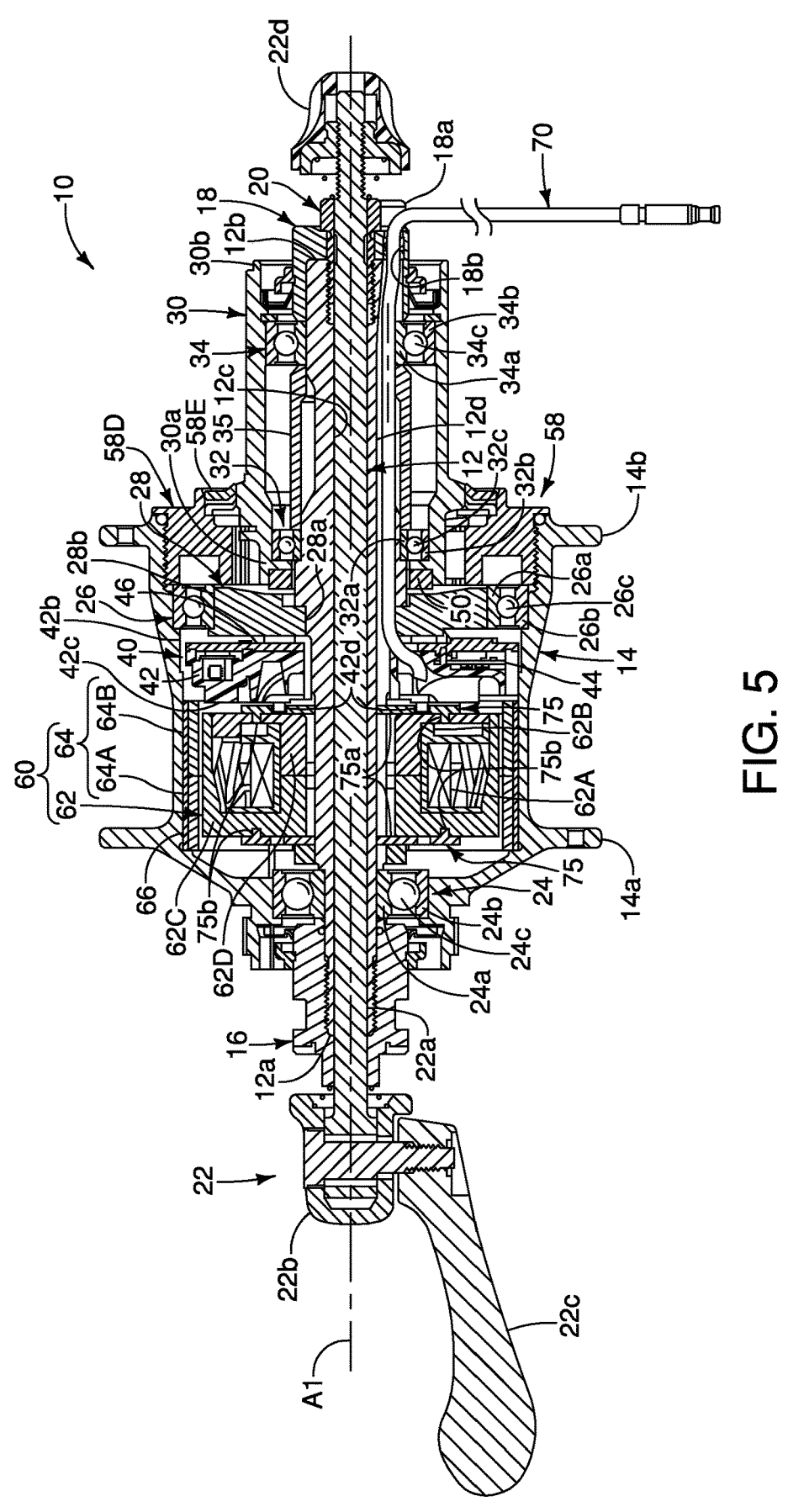
FIG. 5 is a longitudinal cross-sectional view of the hub assembly illustrated in FIGS. 2 to 4 as seen along section line 5-5 in FIG. 3.

As seen in FIG. 5, the hub axle 12 is a rigid member made of a suitable material such as a metallic material. Here, the hub axle 12 is a tubular member. The hub axle 12 has a first axial end 12a, a second axial end 12b and an axial bore 12c. The axial bore 12c extends between the first axial end 12a and the second axial end 12b. The hub axle 12 can be a one-piece member or made of several pieces. Here, the hub axle 12 is provided with a first end piece or end cap 16 and a second end piece or end cap 18. The first end cap 16 is mounted to the first axial end 12a (left side in FIGS. 2 to 5) of the hub axle 12, and the second end cap 18 is mounted to the second axial end 12b (right side in FIGS. 2 to 5) of the hub axle 12. For example, the first end cap 16 is threaded on the first axial end 12a of the hub axle 12, and the second end cap 18 is secured to the second axial end 12b of the hub axle 12 by a fixing bolt 20 that is threaded into the axial bore 12c of the hub axle 12. In this way, the first end cap 16 and the fixing bolt 20 are received in mounting openings of the rear frame body RB as seen in FIG. 2. Here, the second end cap 18 includes a rotation restriction part 18a which is also received in one of the mounting openings of the rear frame body RB. The rotation restriction part 18a engages the rear frame body RB so that rotation of the hub axle 12 relative to the rear frame body RB is restricted.

Here, as seen in FIGS. 2 and 5, the hub assembly 10 further comprises a wheel holding mechanism 22 for securing the hub axle 12 of the hub assembly 10 to the rear frame body RB. The wheel holding mechanism 22 basically includes a shaft or skewer 22a, a cam body 22b, a cam lever 22c and an adjusting nut 22d. The cam lever 22c is attached to one end of the skewer 22a via the cam body 22b, while the adjusting nut 22d is threaded on the other end of the skewer 22a. The lever 22c is attached to the cam body 22b. The cam body 22b is coupled between the skewer 22a and the cam lever 22c to move the skewer 22a relative to the cam body 22b. Thus, the lever 22c is operated to move the skewer 22a in the axial direction of the rotational center axis A1 with respect to the cam body 22b to change the distance between the cam body 22b and the adjusting nut 22d. Preferably, a compression spring is provided at each end of the skewer 22a. Alternatively, the hub axle 12 can be non-rotatably attached to the rear frame body RB with other attachment structures as needed and/or desired.

As indicated in FIGS. 1, 3 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the rotational center axis A1 from a peripheral surface of the hub body 14. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

As seen FIG. 5, the hub assembly 10 further comprises a first hub body bearing 24. The first hub body bearing 24 rotatably supports the hub body 14. Preferably, the hub assembly 10 further comprises a second hub body bearing 26 rotatably supporting an end of the hub body 14. The first hub body bearing 24 rotatably supports the other end of the hub body 14 with respect to the rotational center axis A1. The first hub body bearing 24 includes a first inner race 24a, a first outer race 24b and a plurality of first roller elements 24c. The first roller elements 24c are disposed between the first inner race 24a and the first outer race 24b. The second hub body bearing 26 includes a second inner race 26a, a second outer race 26b and a plurality of second roller elements 26c. The second roller elements 26c are disposed between the second inner race 26a and the second outer race 26b. The first hub body bearing 24 and the second hub body bearing 26 are radial ball bearings.

Here, the hub assembly 10 further comprises a bearing spacer 28. The bearing spacer 28 is provided on the hub axle 12 and supports the hub body 14 via the second hub body bearing 26. The bearing spacer 28 supports the second hub body bearing 26. The bearing spacer 28 has an inner peripheral end 28a provided to the hub axle 12 and an outer peripheral end 28b spaced radially outward of the inner peripheral end 28a in a radial direction with respect to the rotational center axis A1. The second hub body bearing 26 is disposed at the outer peripheral end 28b of the bearing spacer 28 and rotatably supports the hub body 14. The bearing spacer 28 is non-rotatable with respect to the hub axle 12. In particular, as seen in FIG. 4, the inner peripheral end 28a defines a non-circular opening 28a1 that mates with a non-circular portion of the hub axle 12 to non-rotatably couple the bearing spacer 28 with respect to the hub axle 12. The axial position of the bearing spacer 28 with respect to the hub axle 12 can be determined by being sandwiched between a step provided on the hub axle 12 and a nut screwed to the hub axle 12.

Here, the bearing spacer 28 includes an axial opening 28c. The axial opening 28c is at least partly formed in an angular region RA. The angular region RA is defined between a horizontally forward direction HD and a vertically upward direction VD that is perpendicular to the horizontally forward direction HD, in a mounting state where the hub assembly 10 is mounted to the human-powered vehicle V. A central angle θ (see FIG. 7) is defined by the horizontally forward direction HD and the vertically upward direction VD is equal to ninety degrees. The horizontally forward direction HD and the vertically upward direction VD extend from the rotational center axis A1. The horizontally forward direction HD basically corresponds to a forward direction of the human-powered vehicle V and the vertically upward direction VD basically corresponds to an upward direction of the human-powered vehicle V. The region between the horizontally forward direction HD and the vertically upward direction VD is less susceptible to chain tension. Thus, the addition of the axial opening 28c does not adversely affect the reliability of the bearing spacer 28.

Here, the hub assembly 10 further comprises a sprocket support structure 30. In the illustrated embodiment, the sprocket support structure 30 supports the rear sprockets CS as seen in FIG. 2. The sprocket support structure 30 is rotatably disposed around the rotational center axis A1 to transmit a driving force to the hub body 14 while rotating in a driving rotational direction D1 around the rotational center axis A1. As explained below, the sprocket support structure 30 does not transmit a driving force to the hub body 14 while rotating in a non-driving rotational direction D2 around the rotational center axis A1. The non-driving rotational direction D2 is opposite to the driving rotational direction D1 with respect to the rotational center axis A1. The rotational center axis of the sprocket support structure 30 is disposed concentrically with the rotational center axis A1 of the hub assembly 10.

While the sprocket support structure 30 is configured to non-rotatably support the rear sprockets CS, the sprocket support structure 30 is not limited to the illustrated embodiment. Alternatively, one or more of the rear sprockets CS can be integrally formed with the sprocket support structure 30. In any case, the sprocket support structure 30 and the rear sprockets CS are coupled together to rotate together in both the driving rotational direction D1 and the non-driving rotational direction D2.

The hub assembly 10 further comprises a first sprocket support bearing 32 and a second sprocket support bearing 34. The first sprocket support bearing 32 rotatably supports a first end 30a of the sprocket support structure 30. The second sprocket support bearing 34 rotatably supports a second end 30b of the sprocket support structure 30. The first sprocket support bearing 32 and the second sprocket support bearing 34 have outer diameters that are smaller than the outer peripheral end 28b of the bearing spacer 28. The inner diameter of the first sprocket support bearing 32 is larger than the inner diameter of the second sprocket support bearing 34. Thus, the first sprocket support bearing 32 and the second sprocket support bearing 34 can be mounted on the hub axle 12 from the second axial end 12b of the hub axle 12. The first sprocket support bearing 32 includes a first inner race 32a, a first outer race 32b and a plurality of first roller elements 32c. The first roller elements 32c are disposed between the first inner race 32a and the first outer race 32b. The second sprocket support bearing 34 includes a second inner race 34a, a second outer race 34b and a plurality of second roller elements 34c. The second roller elements 34c are disposed between the second inner race 34a and the second outer race 34b. Here, the first sprocket support bearing 32 and the second sprocket support bearing 34 are radial ball bearings. A tubular spacing element 35 is disposed between the first sprocket support bearing 32 and the second sprocket support bearing 34.

Figure 6:
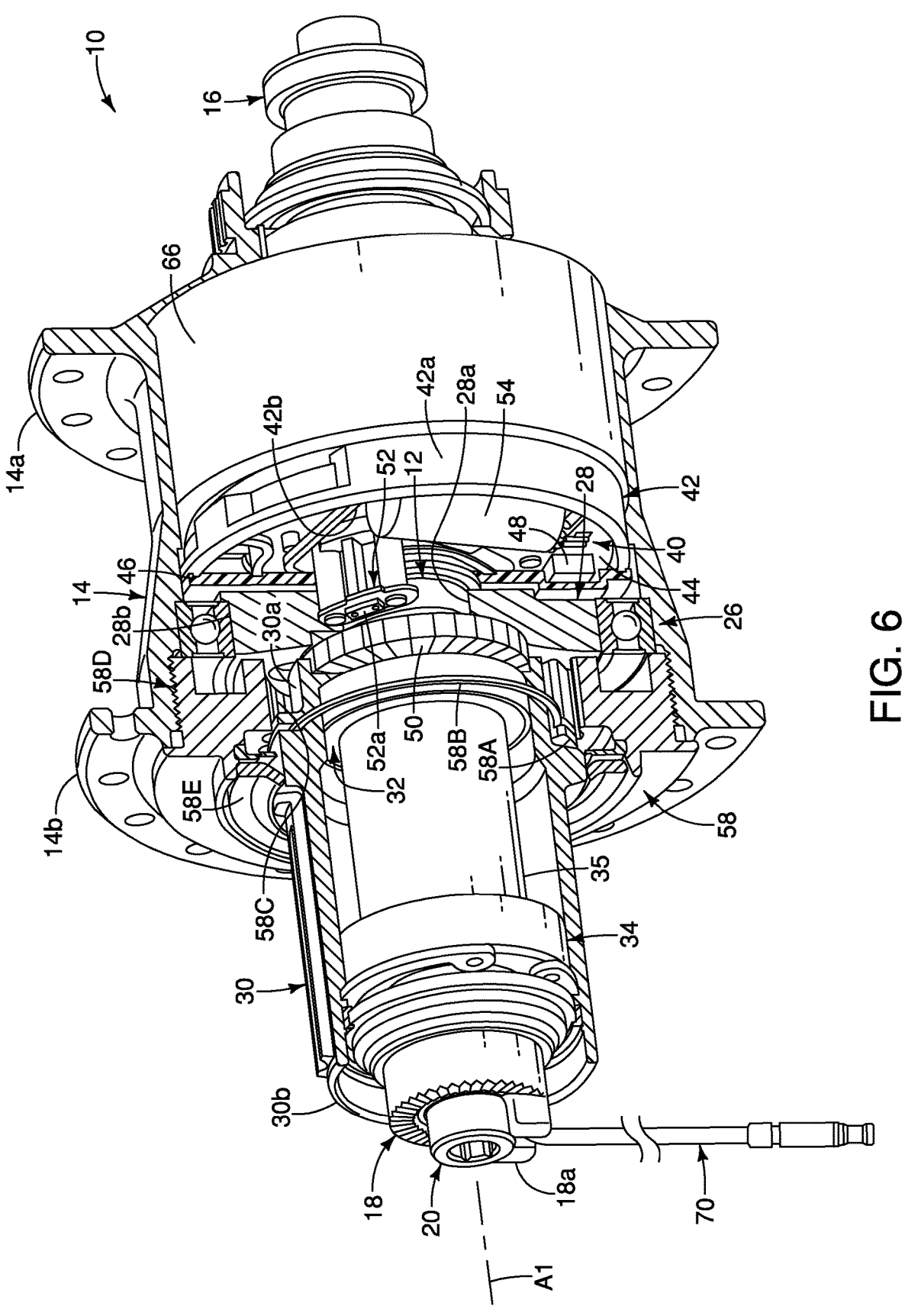
FIG. 6 is a perspective view of the hub assembly illustrated in FIGS. 2 to 5 with portions of the hub broken away.
Figure 8:
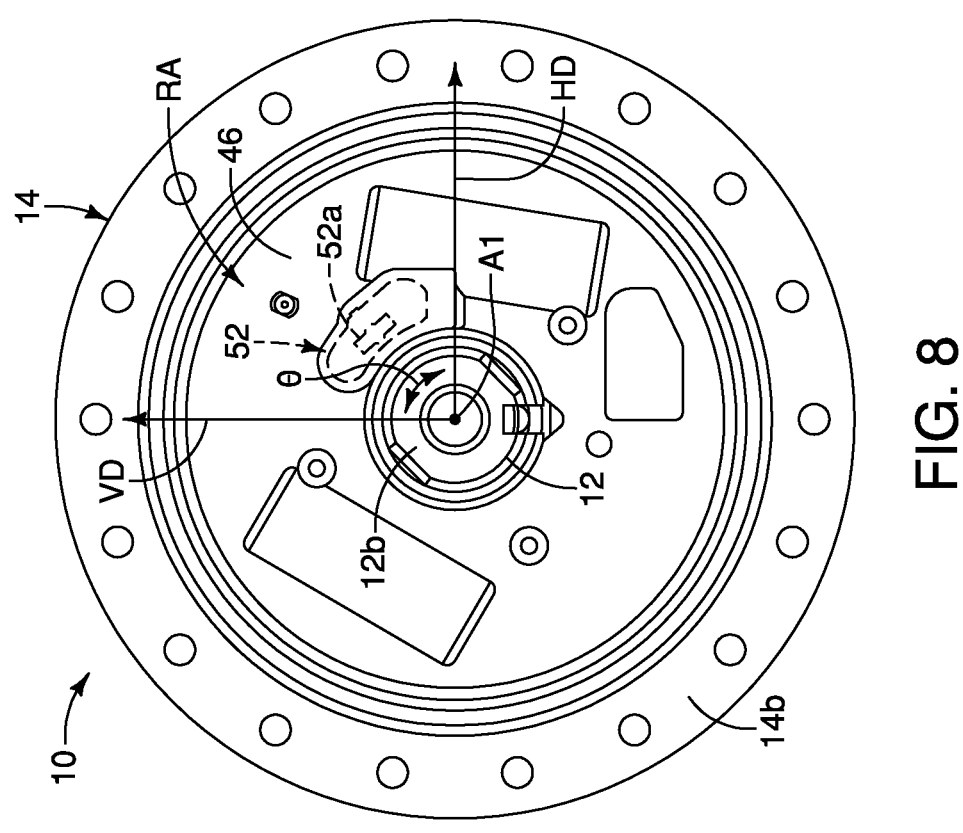
FIG. 8 is an end elevational view of the hub assembly illustrated in FIG. 7 but in which the bearing spacer has been removed.

As seen in FIGS. 5 and 6, the hub assembly 10 further comprises an electrical component 40. While the electrical component 40 is part of the hub assembly 10, the electrical component 40 can be used with other components of the human-powered vehicle. Thus, the electrical component 40 is provided to the human-powered vehicle V. Here, the hub assembly 10 further comprises a housing 42 disposed in the hub body 14. The housing 42 is part of the electrical component 40. In other words, the electrical component 40 includes the housing 42.

Also, the hub assembly 10 further comprises an electric circuit board 44 that is disposed in the hub body 14. In particular, the electric circuit board 44 is disposed in the housing 42. Also, a lid 46 is attached to the housing 42 for enclosing the electric circuit board 44 in the housing 42. Here, the lid 46 is bonded to the housing 42 by adhesive or welding. However, the lid 46 can be attached to the housing 42 by threaded fastener, rivets, etc. Preferably, the housing 42 and the lid 46 are rigid members made from a suitable material. For example, the housing 42 and the lid 46 are made of a resin material. For example, the housing 42 and the lid 46 can each be injected molded members. In the illustrated embodiment, the bearing spacer 28 is fixedly attached to the housing 42 and the lid 46 by a plurality of threaded fasteners 47.

The housing 42 is non-rotatable with respect to the hub axle 12. The housing 42 is configured to house the electrical component 40. In the illustrated embodiment, the electric circuit board 44 is disposed in the housing 42. The housing 42 is configured to house the electric circuit board 44 as well as other items elements. In particular, the housing 42 has an outer peripheral surface 42a defining an internal space 42b in which the electric circuit board 44 is disposed. As seen in FIGS. 5 and 6, the lid 46 is coupled to the housing 42 to protect the electric circuit board 44 and the capacitor 54. The lid 46 overlies an internal space 42b of the housing 42. Thus, at least the housing 42, the electric circuit board 44, the capacitor 54 and the lid 46 can be considered to constitute an electrical unit that is disposed in the hub body 14. The internal space 42b has a donut shape in that the hub axle 12 passes through a center area of the housing 42. In this way, the electric circuit board 44 is non-rotatable with respect to the hub axle 12. The electric circuit board 44 is arranged perpendicular to the rotational center axis A1. The electric circuit board 44 is a part of the electrical component 40. The housing 42 includes an end wall portion 42c. The end wall portion 42c of the housing 42 includes a plurality of keying protrusions 42d. As described later, the keying protrusions 42d can be provided to engage a non-rotatable member that is provided to the hub axle 12 for non-rotatably coupling the housing 42 to the hub axle 12.

Figure 9:
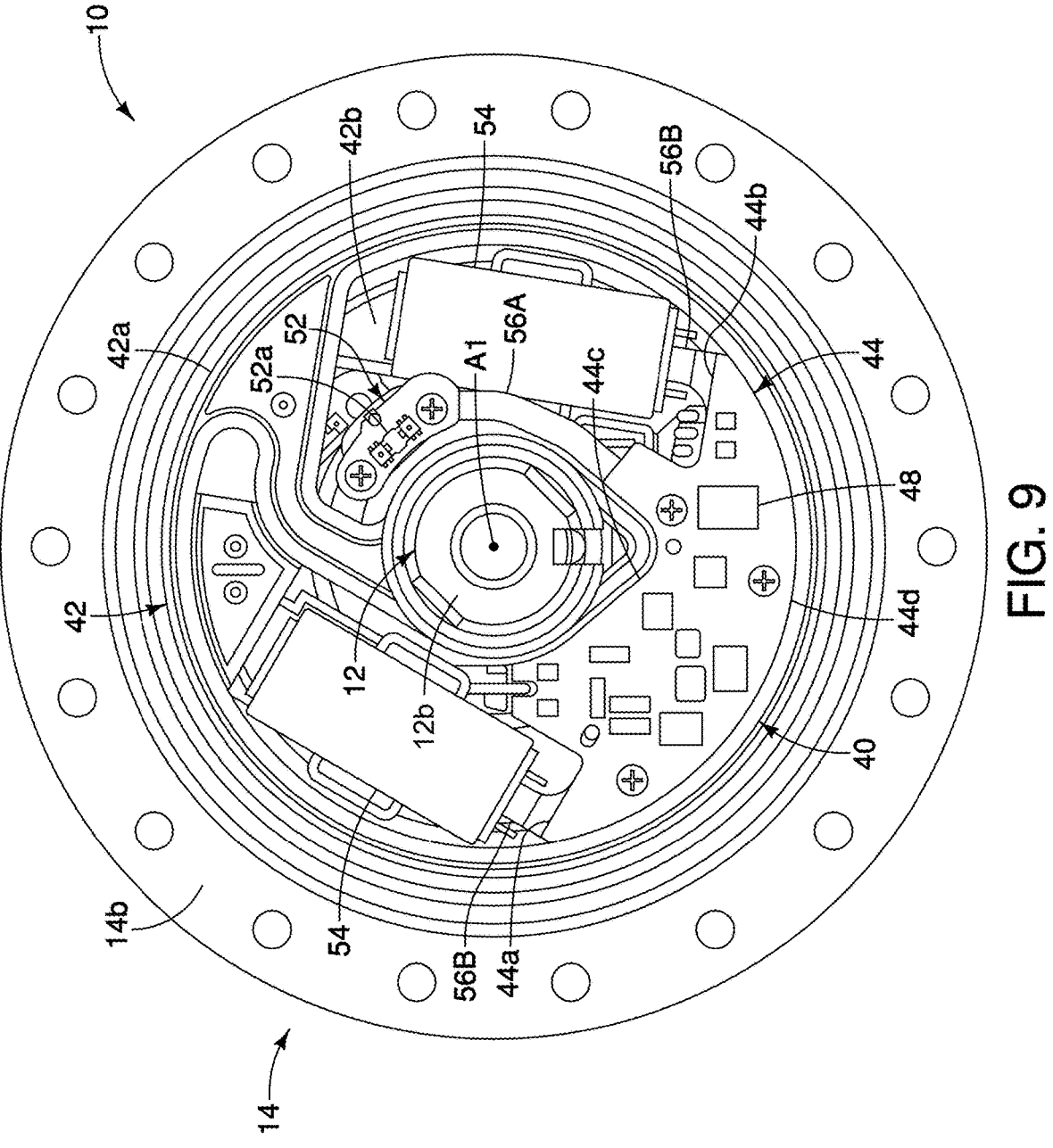
FIG. 9 is an end elevational view of the hub assembly illustrated in FIG. 7 but in which the lid has been removed.
Figures 10, 11:
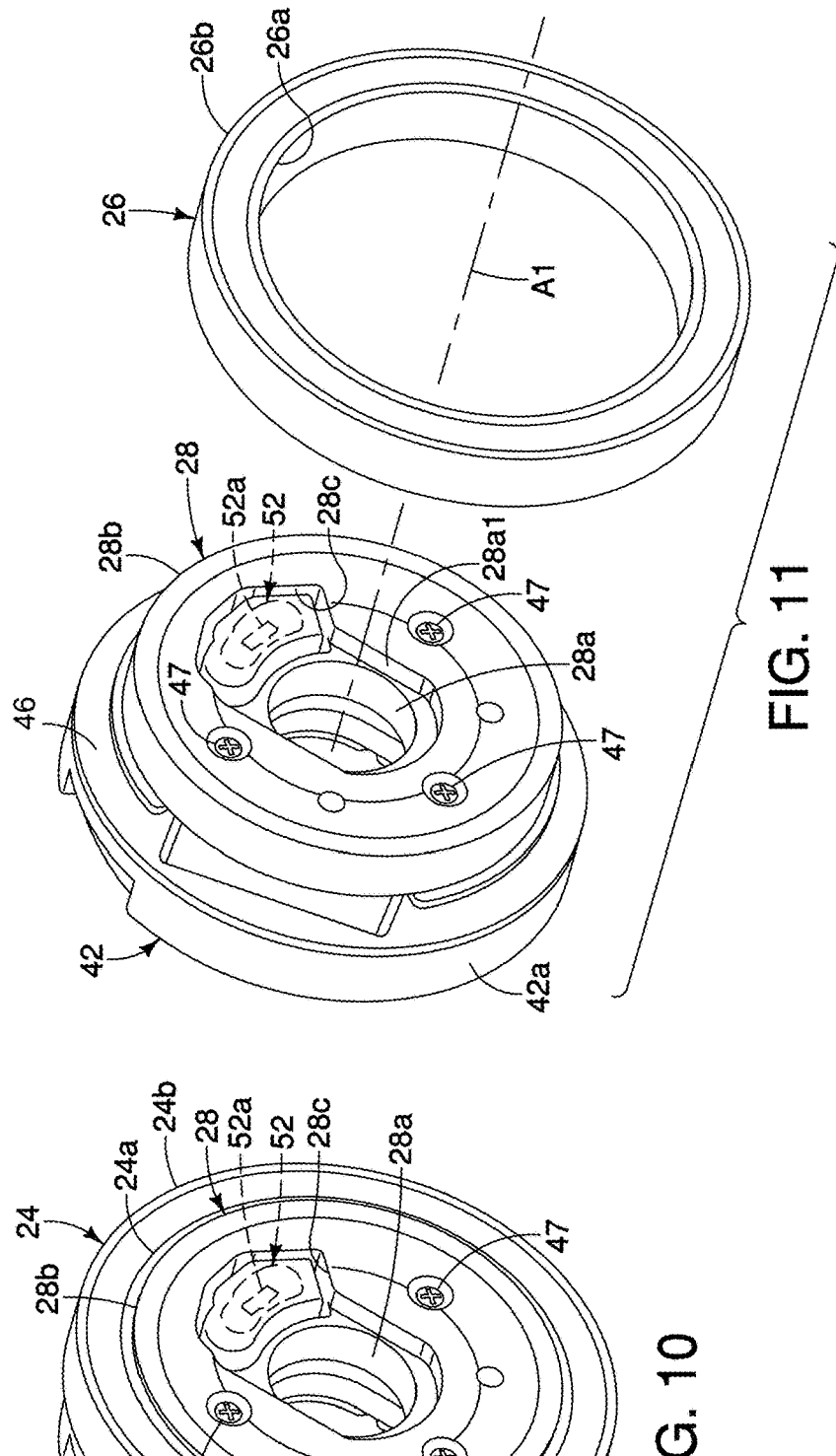
FIG. 10 is a perspective view of the electrical component, the bearing spacer and one of the hub body bearings of hub assembly illustrated in FIGS. 2 to 6.
FIG. 11 is a partial exploded perspective view of the electrical component, the bearing spacer and one of the hub body bearings of hub assembly illustrated in FIGS. 2 to 6.
Figure 12:
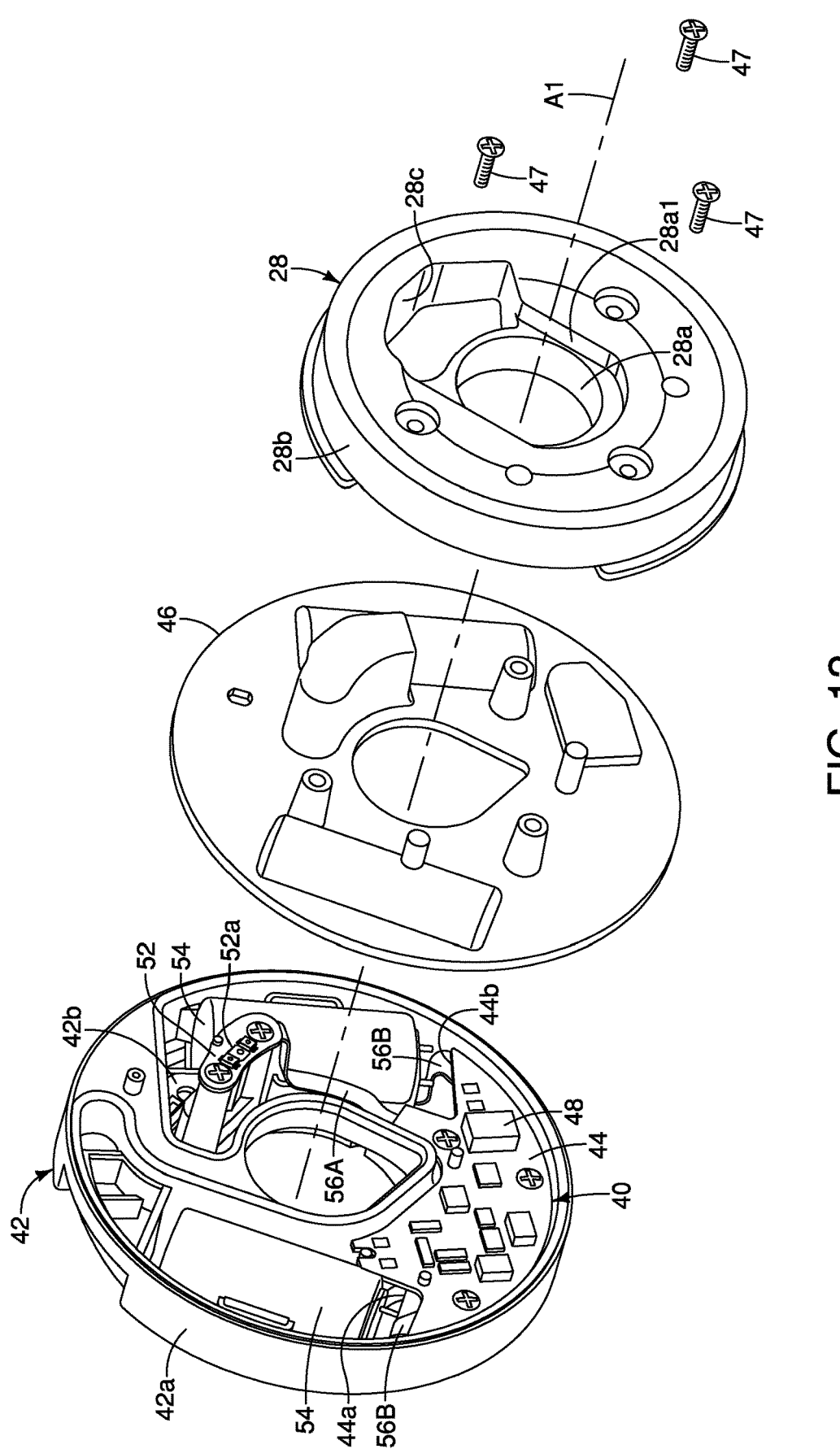
FIG. 12 is a partial exploded perspective view of the electrical component and the bearing spacer illustrated in FIGS. 2 to 6.

As seen in FIG. 9, in the illustrated embodiment the electric circuit board 44 has an arc shape. Here, the electric circuit board 44 has a first circumferential end portion 44a and a second circumferential end portion 44b. The electric circuit board 44 also has at least one arc shaped edge extending at least partly from the first end portion 44a to the second end portion 44b. Here, the at least one arc shaped edge includes at least one of an inner arc shaped edge 44c and an outer arc shaped edge 44d with respect to the rotational center axis A1. The electric circuit board 44 further includes an electronic controller 48 that provided on the electric circuit board 44. The electronic controller 48 is configured to receive a detection signal from the rotation detection sensor 52a. The electronic controller 48 includes at least one processor that executes predetermined control programs. The at least one processor can be, for example, a central processing unit (CPU) or a micro processing unit (MPU). The term "electronic controller" as used herein refers to hardware that executes a software program, and does not include a human. Preferably, the electric circuit board 44 further includes a data storage device (memory) that provided on the electric circuit board 44. The data storage device (memory) stores various control programs and information used for various control processes including power generation control, power storage control, hub rotation detection control, etc. The data storage device includes any computer storage device or any non-transitory computer-readable medium with the sole exception of a transitory, propagating signal. For example, the data storage device includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

As seen in FIG. 6, the hub assembly 10 further comprises a detected part 50 that is coupled to the sprocket support structure 30. In particular, the detected part 50 is fixed to the sprocket support structure 30 so that the detected part 50 and the sprocket support structure 30 rotate together about the hub axle 12. The hub assembly 10 further comprises a sensor 52 disposed in the hub body 14. The sensor 52 is disposed in the hub body 14. The sensor 52 is configured to detect the detected part 50 that is provided to the sprocket support structure 30. In particular, the sensor 52 is provided in the internal space 42*b* of the housing 42. In this way, the sensor 52 is non-rotatably mounted to the hub axle 12. Thus, the sensor 52 does not rotate with the hub body 14. The sensor 52 is also a part of the electrical component 40. Here, the sensor 52 includes a rotation detection sensor 52*a* configured to detect the detected part 50 such that rotation of the sprocket support structure 30 around the rotational center axis A1 is detected. Since the rotation detection sensor 52*a* is connected to the electric circuit board 44, the rotation detection sensor 52*a* are non-rotatable with respect to the hub axle 12. As seen in FIG. 6, the rotation detection sensor 52*a* is disposed in the hub body 14 at a location spaced radially outward from the hub axle 12.

Figure 7:
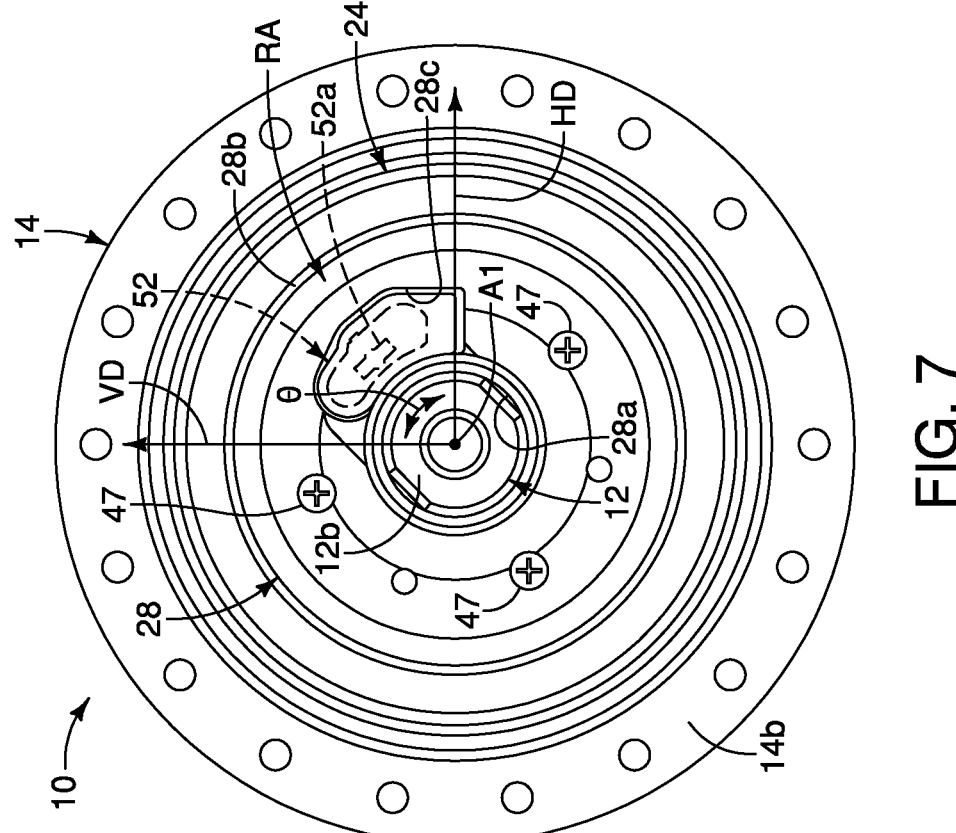
FIG. 7 is an end elevational view of the hub assembly illustrated in FIG. 4 in which selective part have been removed to show the bearing spacer.

As seen in FIGS. 4 and 7, the sensor 52 is disposed at a position that is axially aligned within the axial opening 28*c* of the bearing spacer 28. In this way, the bearing spacer 28 does not interfere with the sensor 52 detecting the detected part 50 that is provided to the sprocket support structure 30. As seen in FIG. 6, the sensor 52 disposed at a position separated from the electric circuit board 44. In particular, the sensor 52 is arranged at a position separated from the electric circuit board 44 in a direction parallel to the rotational center axis A1. The sensor 52 is electrically connected to the electric circuit board 44.

In the illustrated embodiment, the rotation detection sensor 52*a* includes a magnetic sensor, and the detected part 50 includes a magnet. Thus, the magnetic sensor detects movement of the magnet, which rotates together with the sprocket support structure 30. In other words, with this arrangement, the rotation detection sensor 52*a* is configured to detect the detected part 50 to detect rotation of the sprocket support structure 30 around the center axis A1. The electronic controller 48 is configured to receive a detection signal from the rotation detection sensor 52*a*.

Here, the magnet of the detected part 50 is an annular member with alternating S-pole sections and N-pole sections. In this way, the rotation detection sensor 52*a* can detect a rotational amount and a rotational direction of the sprocket support structure 30. However, the detected part 50 is not limited to the illustrated annular member. For example, the detected part 50 can be formed of a single non-annular magnet, or two or more magnets that are circumferentially spaced apart about the center axis A1. In the case of using two or more circumferentially spaced magnets, a back yoke can be provided and the circumferentially spaced magnets can be provided to the back yoke. In this way, the circumferentially spaced magnets can be easily installed in the hub 10. The term "sensor" as used herein refers to a hardware device or instrument designed to detect the presence or absence of a particular event, object, substance, or a change in its environment, and to emit a signal in response. The term "sensor" as used herein do not include a human.

Among other things, the electrical component 40 comprises the electric circuit board 44, at least one conductor and at least one capacitor. The at least one capacitor is electrically connected to the at least one conductor. As explained below, an additional conductor electrically connecting the sensor 52 and the electric circuit board 44. The hub 10 comprises at least one capacitor 54. Here, the electrical component 40 comprises two capacitors 54. Also, here, the electrical component 40 comprises a first conductor 56A and a pair of second conductors 56B. The capacitors 54 are examples of an electric power storage of the electrical component 40. In other words, the capacitor 54 is also a part of the electrical component 40. The capacitors 54 are preferably disposed in the housing 42 of the hub assembly 10. Thus, the capacitors 54 are non-rotatably supported on the hub axle 12 by the housing 42. The sensor 52 is electrically connected to the electric circuit board 44 by the first conductor 56A. Here, the first conductor 56A is a flexible tape conductor. The first conductor 56A can be an electrically conductive lead. On the other hand, the electric circuit board 44 is electrically connected to the capacitors 54 by the second conductors 56B. The second conductors 56B extend from one of the first circumferential end portion 44*a* and the second circumferential end portion 44*b*. Here, one of the second conductors 56B extends from the first circumferential end portion 44*a* to electrical connect one of the capacitors 54 to the electric circuit board 44. The other one of the second conductors 56B extends from the second circumferential end portion 44*b* to electrical connect the other one of the capacitors 54 to the electric circuit board 44. Here, the second conductors 56B are flexible tape conductors. The second conductors 56B can be an electrically conductive lead. The capacitor 54 is provided in the internal space of the housing 42 at a position other than on the electronic circuit board 44. The capacitor 54 may be held in the housing 42 with an adhesive or the like.

The electric circuit board 44 is electrically connected to the sensor 52 and the capacitor 54. In this way, the capacitor 54 provides electrical power to the electric circuit board 44 and other electrical components electrically connected to the electric circuit board 44. For example, the capacitor 54 provides electrical power to the sensor 52. Also, the electronic controller 48 of the electric circuit board 44 is configured to control the input and output of electric power from the capacitor 54.

As seen in FIGS. 5 and 6, the hub assembly 10 further comprises a one-way clutch 58 that is formed between the hub body 14 and the sprocket support structure 30. The one-way clutch 58 includes a plurality of pawls 58A disposed between the hub body 14 and the sprocket support structure 30. The one-way clutch 58 further includes a biasing element 58B that couples the pawls 58A to the sprocket support structure 30. The one-way clutch 58 further includes a plurality of ratchet teeth 58C. The ratchet teeth 58C are provided to a fixing ring 58D that is fixed to the hub body 14. The ratchet teeth 58C are provided on the inner peripheral surface of the fixing ring 58D. The fixing ring 58D is screwed to the hub body 14. The fixing ring 58D is made of a hard material such as metal. The fixing ring 58D abuts against the outer race 26*b* of the second hub body bearing 26 in the axial direction with respect to the rotational center axis A1. The opposite side of the outer race 26*b* of the second hub body bearing 26 in the axial direction abuts against a step formed in the hub body 14. The outer race 26*b* of the second hub body bearing 26 is restricted in axial movement by the fixing ring 58D and the steps formed on the hub body 14. The biasing element 58B biases the pawls 58A into engagement with the ratchet teeth 58C of the fixing ring 58D. The biasing element 58B squeezes the pawls 58A against the sprocket support structure 30 such that the pawls 58A pivot towards engagement with the ratchet teeth 58C of the fixing ring 58D. A seal member 58E is provided on the fixing ring 58D. The seal member 58E is formed in a ring shape. The tongue portion of the sealing member 58E is in contact with the outer peripheral surface of the sprocket support 30.

In this way, the sprocket support structure 30 is coupled to the hub body 14 to rotate together in the driving rotational direction D1 around the center axis A1. Also, in a case where the sprocket support structure 30 is rotated in the non-driving rotational direction D2, the ratchet teeth 58C of the sprocket support structure 30 push the pawls 58A and pivot the pawls 58A to a retracted position against the sprocket support structure 30. Thus, the sprocket support structure 30 is configured to rotate relative to the hub body 14 in the non-driving rotational direction D2 around the center axis A1. In this way, the sprocket support structure 30 and the one-way clutch 58 form a freewheel that is commonly used in bicycles. Since the basic operation of the freewheel is relatively conventional, the freewheel will not be discussed or illustrated in further detail.

As seen in FIG. 5, the hub assembly 10 further comprises an electric power generator 60. The electric power generator 60 provided to the hub body 14, and configured to generate electric power by rotation of the hub body 14. More specifically, the electric power generator 60 is provided to the hub body 14 between the hub axle 12 and a center portion of the hub body 14. The electric power generator 60 is configured to generate electric power by rotation of the hub body 14 relative to the hub axle 12. The electronic controller 48 of the electric circuit board 44 is electrically connected to the electric power generator 60 for controlling the electric power output of the electric power generator 60. Thus, the electric power generated by the electric power generator 60 can be stored and/or supplied directly to other components such as the rotation detection sensor 52a, the rear derailleur RD, etc.

The electric power generator 60 basically includes an armature 62 (i.e., a stator in the illustrated embodiment) and a magnet 64 (i.e., a rotor in the illustrated embodiment). While the armature 62 is illustrated as being fixed with respect to the hub axle 12 and the magnet 64 is illustrated as being fixed with respect to the hub body 14, the armature 62 can be fixed with respect to the hub body 14 and the magnet 64 can be fixed with respect to the hub axle 12. The armature 62 includes a winding coil 62A and a bobbin 62B. The armature 62 further includes a first yoke 62C and a second yoke 62D. The winding coil 62A is wound on the bobbin 62B for supporting the winding coil 62A. The first yoke 62C includes two or more first yoke pieces that are arranged in the circumferential direction of the hub axle 12. Likewise, the second yoke 62D includes two or more second yoke pieces that are arranged in the circumferential direction of the hub axle 12 and that alternate with the first yoke pieces of the first yoke 62C. The winding coil 62A is located between the first yoke 62C and the second yoke 62D in the axial direction of the hub axle 12.

The magnet 64 includes a plurality of first magnet parts 64A and a plurality of second magnet parts 64B arranged inside a tubular support 66. The tubular support 66 is fixedly coupled to the inside of the hub body 14 so that the magnet 64 and the hub body 14 rotate together around the hub axle 12. The tubular support 66 has the function of a back yoke. The back yoke is a member having a high magnetic permeability, which is arranged on the opposite side of the magnetized surface. By using the back yoke, a high generated magnetic field can be obtained. The tubular support 66 can be omitted. Alternatively, the hub body 14 can have the magnet 64 such that the hub body 14 partially forms the electric power generator 60. The first magnet parts 64A and the second magnet parts 64B are arranged so that S-poles and N-poles of the first magnet parts 64A and the second magnet parts 64B are alternately arranged in the circumferential direction of the hub axle 12. Therefore, the S-poles of the first magnet parts 64A are not aligned with the S-poles of the second magnet parts 64B, and the N-poles of the first magnet parts 64A are not aligned with the N-poles of the second magnet parts 64B in the axial direction of the hub axle 12.

Also, the hub assembly 10 further comprises an electrical cable 70. The electrical cable 70 is electrically connected at one end to the electric circuit board 44, which in turn is connected to the electric power generator 60. The other end of the electrical cable 70 is electrically connected to another electrical component of the human-powered vehicle V such as the rear derailleur RD, the battery pack BP or an electrical junction. In this way, the electrical cable 70 can provide electric power generated by the hub assembly 10 to the rear derailleur RD, the battery pack BP or another electrical component. The electrical cable 70 can also be used to transmit signals from the electronic controller 48 of the electric circuit board 44 to the rear derailleur RD or another electrical component using power line communication (PLC).

The electrical cable 70 enters the hub assembly 10 thorough an opening 18b of the end cap 18. Then, the electrical cable 70 extends axially along the hub axle 12 and passes through the bearing spacer 28. The electrical cable 70 enters the housing 42 of the electrical component 40 through the lid 46. In the housing 42 of the electrical component 40, the electrical cable 70 is electrically connected to the electric circuit board 44. Preferably, as in the illustrated embodiment, the electrical cable 70 is disposed in an axially extending recess or groove 12d of the hub axle 12. The axially extending recess or groove 12d at least extends from the second axial end 12b to inside the housing 42 of the electrical component 40. Here, the groove 12d extends from the second axial end 12b past the electric power generator 60.

The hub 10 further includes two fixing plates 75 that are provided on the hub axle 12 for non-rotatably coupling the electric power generator 60 to the hub axle 12. The fixing plates 75 are provided on opposite axial ends of the electric power generator 60. The fixing plates 75 have a plate shape. Each of the fixing plates 75 includes a protrusion 75a that is disposed in the groove 12d of the hub axle 12. By inserting the protrusions 75a into the groove 12d of the hub axle 12, the fixing plates 75 do not rotate with respect to the hub axle 12. The electric power generator 60 does not rotate with respect to the hub axle 12 by engaging with protrusions 75b protruding from an axially facing surface of the fixing plate 75. The fixing plates 75 are arranged so as to sandwich the electric power generator 60 from both sides in the axial direction of the electric power generator 60. The rotation of the fixed plates 75 with respect to the hub axle 12 are also suppressed by providing D-shaped cutouts that matches a corresponding outer surface of the hub axle 12. One of the pair of fixing plates 75 can be omitted.

Also, the housing 42 can be non-rotatably coupled to one of the fixing plates 75 for suppressing rotation of the housing 42 with respect to the hub axle 12. For example, the keying protrusions 42d of the housing 42 are configured to engage openings one of the fixing plates 75 that is keyed to the groove 12d of the hub axle 12. The fixing plate 75 includes a plurality of openings corresponding to the plurality of protrusions 42d. In this way, the housing 42 is prevented from rotating relative to the hub axle 12. Alternatively, the housing 42 can be attached to the bearing spacer 28, which is non-rotatably coupled to the hub axle 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub. Accordingly, these directional terms, as utilized to describe the hub should be interpreted relative to a human-powered vehicle (e.g., bicycle) in an upright riding position on a horizontal surface and that is equipped with the hub. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub assembly for a human-powered vehicle, the bub assembly comprising:
   a hub axle;
   a hub body rotatably mounted on the hub axle to rotate around a rotational center axis of the hub assembly;
   a bearing spacer having an inner peripheral end non-rotatably coupled to the hub axle and an outer peripheral end spaced radially outward of the inner peripheral end in a radial direction with respect to the rotational center axis; and
   a first hub body bearing disposed at the outer peripheral end of the bearing spacer and rotatably supporting the hub body.

2. The hub assembly according to claim 1, wherein the bearing spacer includes an axial opening at least partly formed in an angular region defined between a horizontally forward direction and a vertically upward direction that is perpendicular to the horizontally forward direction, in a mounting state where the hub assembly is mounted to the human-powered vehicle, a central angle defined by the horizontally forward direction and the vertically upward direction is equal to ninety degrees, and the horizontally forward direction and the vertically upward direction extend from the rotational center axis.

3. The hub assembly according to claim 1, further comprising
   an electric circuit board disposed in the hub body, and
   a sensor disposed in the hub body, the sensor being electrically connected to the electric circuit board by a first conductor.

4. The hub assembly according to claim 3, wherein the sensor is arranged at a position separated from the electric circuit board in a direction parallel to the rotational center axis.

5. The hub assembly according to claim 4, wherein the electric circuit board is arranged perpendicular to the rotational center axis.

6. The hub assembly according to claim 3, wherein the bearing spacer includes an axial opening, and the sensor is disposed at a position that is axially aligned within the axial opening of the bearing spacer.

7. The hub assembly according to claim 6, further comprising a sprocket support structure rotatably disposed around the rotational center axis to transmit a driving force to the hub body while rotating in a driving rotational direction around the rotational center axis.

8. The hub assembly according to claim 7, further comprising a detected part coupled to the sprocket support structure, and the sensor including a rotation detection sensor configured to detect the detected part such that rotation of the sprocket support structure around the rotational center axis is detected.

9. The hub assembly according to claim 7, further comprising a first sprocket support bearing rotatably supporting a first end of the sprocket support structure, and a second sprocket support bearing rotatably supporting a second end of the sprocket support structure, the first sprocket support bearing and the second sprocket support bearing having outer diameters that are smaller than the outer peripheral end of the bearing spacer.

10. The hub assembly according to claim 3, wherein the electric circuit board is electrically connected to a capacitor by a second conductor.

11. The hub assembly according to claim 10, wherein the electric circuit board has an arc shape, and has a first circumferential end portion, a second circumferential end portion and at least one are shaped edge extending at least partly from the first circumferential end portion to the second circumferential end portion, and the second conductor extends from one of the first circumferential end portion and the second circumferential end portion.

12. The hub assembly according to claim 11, wherein the at least one arc shaped edge includes at least one of an inner arc shaped edge and an outer are shaped edge with respect to the rotational center axis.

13. The hub assembly according to claim 11, further comprising a housing disposed in the hub body, and having an outer peripheral surface defining an internal space in which the electric circuit board is disposed.

14. The hub assembly according to claim 13, wherein the housing is non-rotatable with respect to the hub axle.

15. The hub assembly according to claim 3, further comprising a second hub body bearing rotatably supporting an end of the hub body, and the first hub body bearing rotatably supporting the other end of the hub body with respect to the rotational center axis.

16. The hub assembly according to claim 1, further comprising an electric power generator provided to the hub body, and configured to generate electric power by rotation of the hub body.

17. The hub assembly according to claim 1, wherein the first hub body bearing includes a first inner race and a first outer race, the first inner race contacting the outer peripheral end of the bearing spacer and the first outer race contacting the hub body.

18. An electrical component for a human-powered vehicle, the electrical component comprising:
an electric circuit board having an arc shape, and having a first circumferential end portion, a second circumferential end portion and at least one arc shaped edge extending at least partly from the first circumferential end portion to the second circumferential end portion;
at least one conductor extending from the electric circuit board;
at least one capacitor electrically connected to the at least one conductor;
a sensor arranged to be separated from the electric circuit board in a direction parallel to a thickness direction of the electric circuit board, the sensor being positioned such that the sensor does not overlap the electric circuit board when viewed along the direction parallel to the thickness direction of the electric circuit board; and
an additional conductor electrically connecting the sensor and the electric circuit board.

19. The electrical component according to claim 18, wherein the at least one capacitor is arranged spaced apart from the electric circuit board in a circumferential direction of the arc shape such that the at least one capacitor does not overlap the electric circuit board when viewed along the direction parallel to the thickness direction of the electric circuit board.

20. The electrical component according to claim 18, wherein the additional conductor does not overlap the electric circuit board when viewed along the direction parallel to the thickness direction of the electric circuit board.

21. The electrical component according to claim 18, wherein the at least one capacitor includes a first capacitor and a second capacitor, and the sensor is disposed between the first capacitor and the second capacitor when viewed along the direction parallel to the thickness direction of the electric circuit board.

22. A hub assembly for a human-powered vehicle, the hub assembly comprising:
a hub axle;
a hub body rotatably mounted on the hub axle to rotate around a rotational center axis of the bub assembly;
an electrical component disposed inside the hub body, the electrical component comprising
a housing disposed circumferentially around the hub axle,
an electric circuit board disposed at least partly inside the housing,
a first capacitor electrically connected to the electric circuit board, and
a second capacitor electrically connected to the electric circuit board,
the hub axle being disposed between the first capacitor and the second capacitor when viewed along an axial direction parallel to the rotational center axis.

23. The hub assembly according to claim 22, wherein both the first capacitor and the second capacitor are arranged to overlap the electric circuit board when viewed along a radial direction perpendicular to the rotational center axis.

24. The hub assembly according to claim 22, wherein the electrical component further comprises a first conductor extending from the electric circuit board, and a second conductor extending from the electric circuit board, the electric circuit board having a first circumferential end portion and a second circumferential end portion, the first circumferential end portion being closer to the first conductor than to the second conductor and the second circumferential end portion being closer to the second conductor than to the first conductor.

25. The hub assembly according to claim 22, wherein the electrical component further comprises a sensor electrically connected to the electric circuit board, the sensor being configured to detect rotation of a sprocket support structure around a rotational center axis.

26. The hub assembly according to claim 25, wherein at least one of the first capacitor and the second capacitor is configured to provide electrical power to the sensor.

\* \* \* \* \*